3,074,952
4-ALKOXY PIPERIDINES
Alan Frederick Casy, Chiswick, London, and Arnold Heyworth Beckett, Bromley, England, assignors to Arnold Heyworth Beckett, Bromley, Kent, England
No Drawing. Filed Jan. 30, 1961, Ser. No. 85,513
Claims priority, application Great Britain Feb. 10, 1960
8 Claims. (Cl. 260—293.4)

This invention relates to new piperidine derivatives having valuable therapeutic properties.

More specifically the compounds of this invention have analgesic and central nervous system depressant activity. These compounds are particularly valuable as analgesic agents combining high potency with a low degree of toxicity.

The new piperidine derivatives of this invention are represented by the following general formula:

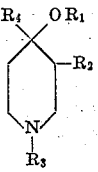
I when:

$R_1$ represents lower alkyl;
$R_2$ represents hydrogen or lower alkyl;
$R_3$ represents $-(CH_2)_m-R_5$ or $-(CH_2)_n-CO-R_5$, where $m$ is an integer having a value of 1–4, $n$ is an integer having a value of 2–3;
$R_4$ represents furyl, lower alkylfuryl, thienyl, or lower alkylthienyl; and
$R_5$ represents phenyl, halophenyl, lower alkylphenyl or aminophenyl.

When $R_3$ in Formula I is $-(CH_2)_m-R_5$, the compounds of this invention have the general formula:

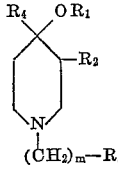
II

The terms $R_1$, $R_2$, $R_4$, $R_4$ and $m$ are as defined above.

When $R_3$ in Formula I is $-(CH_2)_n-CO-R_5$ the compounds of the invention have the general formula:

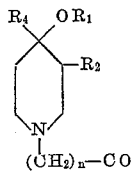
III

The terms $R_1$, $R_2$, $R_4$, $R_5$ and $n$ are as defined above.

The term $R_5$ as used herein denotes furyl and thienyl groups attached at their 2-position.

The preferred compounds of this invention are those of Formula II in which $R_4$ is 2-furyl, $R_5$ is phenyl and $R_2$ is lower alkyl. A particularly advantageous and useful compound is 4-ethoxy-4-(2'-furyl)-3-methyl-N-(2'-phenethyl)-piperidine.

The term "lower alkyl" where used herein denotes groups having 1–4 carbon atoms, preferably methyl and ethyl.

This invention also includes pharmaceutically acceptable salts of the above defined bases formed with non-toxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, ascorbic, succinic, methanesulfonic, ethanedisulfonic, acetic, tartaric, salicylic, citric, lactic, malic, benzene sulfonic and theophylline acetic acids as well as with the 8-halotheophyllines, for example, 8-bromotheophylline. Exemplary of such inorganic salts are those with hydrochloric, hydrobromic, sulfuric, phosphoric and nitric acids. Of course, these salts may also be prepared by the classical method of double decomposition of appropriate salts which is well-known to the art.

The piperidine compounds of Formula II above are prepared by treating a substituted piperidone of Formula IV below with the appropriate lithium furyl or lithium thienyl. The reaction is advantageously carried out at room temperature for about 20–90 minutes. The resulting organo-metallic complex is decomposed by treatment with excess acetic anhydride to give the corresponding acetoxy ester of Formula V below.

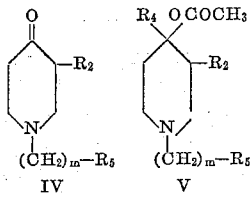

IV     V

Treatment of the ester of Formula V with excess hydrochloric acid in a lower alkyl alcohol having 1–4 carbon atoms gives the hydrochloride salt of the desired 4-alkoxy-piperidine derivative. The free base is obtained by neutralizing an aqueous solution of the hydrochloride salt, extracting with ether and evaporating the ether extracts.

The piperidine compounds of Formula III are prepared by converting a substituted N-benzyl piperidone of Formula VI below into an aminoether of Formula VII below in the manner described in the preceding paragraph.

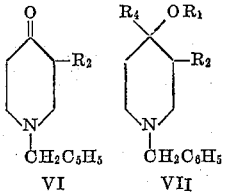

VI     VII

Catalytic hydrogenation of the aminoether VII removes the benzyl group to give a secondary base. Reaction of the secondary base with the methiodide of a Mannich base, having the general Formula VIII, in the presence of dimethylformamide and sodium carbonate gives the piperidine derivative of general Formula III in which $n$ is 2. Reaction of the secondary base with a chloro compound having the general Formula IX by refluxing in toluene in the presence of a trace of potassium iodide, gives the desired piperidine of Formula III in which $n$ is 3.

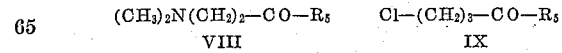

VIII     IX

Similarly, reacting the secondary base with a chloro compound having the general formula X gives the piperidine compounds of Formula II.

$$Cl(CH_2)_m-R_5$$

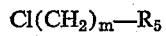
X

The following examples are not limiting but are illustrative of the compounds of this invention and the procedures for their preparation and will serve to make fully apparent all of the compounds embraced by the general formulas given above.

EXAMPLE 1

*N - (2' - Phenethyl - 4 - Ethoxy-3-Methyl-4-(2'-Thienyl)- Piperidine Hydrochloride*

A mixture of thiophen (8.4 g.) and lithium phenyl in ether, prepared from lithium (1.7 g.) and bromobenzene (19 g.), is refluxed for 2 hours, cooled on an ice-bath and treated with N-(2'-phenethyl)-3-methyl-4-piperidone (21.7 g.). The product is treated with excess of acetic anhydride and then added to crushed ice and excess glacial acetic acid. The solid which separates on storage at 5° C. is washed with ether, the base liberated with aqueous ammonia and extracted with ether. After drying on sodium sulphate, the solvent is removed to give crude N-(2'-phenethyl)-4-acetoxy-3-methyl-4-(2' - thienyl)-piperidine. This base, on treatment with excess of ethanolic hydrochloride acid, gives the hydrochloride salt of N-(2'-phenethyl)-4-ethoxy-3-methyl-4-(2' - thienyl)-piperidine, M.P. 200–202° C. (dec.) after crystallization from ether-ethanol.

The free base is obtained by treating the hydrochloride salt with aqueous ammonia, extracting with ether and evaporating the extract.

EXAMPLE 2

*N - (2' - Phenethyl) - 4 - (2'-Furyl)-4-Methoxy-3-Methyl- Piperdine Hydrochloride*

N-(2'-phenethyl)-3-methyl-4-piperidone (5.4 g.) is treated with lithium furyl, prepared from furan (1.7 g.), bromobenzene (4.75 g.) and lithium (0.43 g.), by the method described in Example 1. The product is treated with excess of acetic anhydride and processed as in Example 1 to give crude N-(2 -phenethyl)-4-acetoxy-4-(2'-furyl)-3-methylpiperidine. This base, on treatment with excess of methanolic hydrochloric acid gives the hydrochloride salt of N-(2'-phenethyl)-4-(2'-furyl)-4-methoxy-3-methyl-piperidine, M.P. 168.5° C. after crystallization from ether-ethanol.

EXAMPLE 3

*N-(2'-Phenethyl)-4-Ethoxy-4-(2'-Furyl)-Piperidine Hydrochloride*

N-(2'-phenethyl)-4-piperidone (21.6 g.) is treated with lithium furyl, prepared from furan (7.6 g.), bromobenzene (19 g.) and lithium (1.7 g.). The product is treated with excess of acetic anhydride and processed as in Example 1 to give crude N-(2'-phenethyl)-4-acetoxy-4-(2'-furyl)-piperidine. This base, on treatment with excess of thanolic hydrochloride acid, gives the hydrochloride salt of N-(2'-phenethyl)-4-ethoxy-4-(2'-furyl)-piperidine hydrochloride, M.P. 205–206° C. after crystallization from ether-ethanol.

EXAMPLE 4

*2 - [4' - Ethoxy-4'-(2"-Furyl)-Piperidyl]-Propiophenone Hydrochloride*

A solution of N-benzyl-4-ethoxy-4-(2'-furyl)-piperidine hydrochloride (13.7 g.), prepared by the procedure of Example 3 from N-benzyl-4-piperidone, in ethanol (500 ml.) is shaken with hydrogen in the presence of 10% palladium on charcoal (5 g.) at atmospheric pressure and room temperature. When absorption of gas ceases the product is filtered, the filtrate concentrated, diluted with ether and stored at 5° C. The 4-ethoxy-4-(2'-furyl)-piperidine hydrochloride which separates melts at 149–150° C. after recrystallization from ether-ethanol.

2-dimethylaminopropiophenone methiodide (3.5 g.) and sodium carbonate (1 g.) are added to the 4-ethoxy-4-(2'-furyl)-piperidine prepared in the above manner in dimethylformamide (25 ml.). Dry nitrogen is bubbled through the mixture for 4 hours. The product is diluted with water and stored at 5° C. overnight. Next morning the solvent is decanted from the oil that has separated. The oil is washed with water and dissolved in ether. After drying on sodium sulphate, the solvent is removed and the residue converted to the hydrochloride salt of 2 - [4' - ethoxy - 4' - (2"-furyl)-piperidyl]-propiophenone which melts at 171–172° C. (dec.) after recrystallization from ethanol-ether.

EXAMPLE 5

*3 - [4' - Ethoxy - 4-(2"-Furyl)-Piperidyl]-Butyrophenone Hydrochloride*

A mixture of 4-ethoxy-4-(2'-furyl)-piperidine (1 g.) (prepared in the manner described in Example 4) and 3-chlorobutyrophenone (1 g.) in dry toluene (20 ml.) is refluxed in the presence of a trace of potassium iodide for 10 hours. The product is left overnight and, the next morning, the crystals of 4-ethoxy-4-(2'-furyl)-piperidine hydrochloride which have separated out are collected. The filtrate is extracted with aqueous hydrochloric acid and the aqueous phase separated. The free base is liberated with aqueous ammonia and extracted with ether. After drying on sodium sulphate, the ether is removed and the residual oil converted to the hydrochloride salt of 3 - [4' - ethoxy - 4' - (2"-furyl)-piperidyl]-butyrophenone which melts at 170° C. (dec.) after recrystallization from ethanol-ether.

EXAMPLE 6

*3-[4'-Ethoxy-4'-(2"-Furyl)-Piperidyl]-p-Chlorobutyro- phenone*

This is prepared in the manner described in Example 5, using 3-chloro-p-chlorobutyrophenone, prepared by the reaction of 3-chlorobutyronitrile with p-chlorophenyl magnesium bromide, in place of 3-chlorobutyrophenone. The hydrochloride salt melts at 182–183° C. after crystallization from ethanol-ether.

EXAMPLE 7

*N-(2'-Phenylethyl)-3-Methyl-4-Ethoxy-4--[2'-(5'- Methyl)-Furyl]-Piperidine*

A mixture of 25-methyl furan (9.2 g.) and lithium phenyl in ether, prepared from lithium (1.7 g.) and bromobenzene (19 g.) is stirred at room temperature for 2 hours, cooled on an ice-bath and treated with N-(2'-phenethyl)-3-methyl-4-piperidone (20 g.). After stirring for 1 hour at room temperature, the mixture is treated with acetic anhydride (20 ml.) and then added to crushed ice and excess of glacial acetic acid. The aqueous layer is separated, made basic with dilute aqueous ammonia and the free base extracted with ether. After drying (Na$_2$SO$_4$) the solvent is removed to give crude N-(2'-phenethyl)-4-acetoxy-3 - methyl - 4 - [5' - (2' - methyl)]-piperidine. This base with one mol. of hydrochloric acid gives the corresponding hydrochloride salt, M.P. 223–224° C. after crystallization from ethanol-ether. The same base with excess of hydrochloric acid in ethanol gives the hydrochloride salt of N-(2'-phenethyl)-4-ethoxy-3-methyl-4-[5'-(2' - methyl)furyl] - piperidine M.P. 208° after crystallization from ethanol-ether.

EXAMPLE 8

*N-Benzyl-4-Ethoxy-3-Methyl-4-(2'-Thienyl)- Piperidine Hydrochloride*

This compound is prepared in the manner described in Example 1 using N-benzyl-3-methyl-4-piperidone (20.3 g.), prepared by reacting benzyl chloride with 3-methyl-4-piperidone. The hydrochloride salt is neutralized with aqueous ammonia solution. Extracting with ether and evaporating the extract gives the free base.

Treating a solution of the free base in ethyl acetate with excess maleic acid gives the maleate salt.

EXAMPLE 9

N-[2'-(p-Methylphenethyl)]-4-Butoxy-3-Methyl-4-(2'-Thienyl)-Piperidine

Lithium thienyl, prepared from 8.4 g. of thiophene and lithium phenyl, is treated with 23.0 g. of N-[2'-(p-methylphenethyl)]-3-methyl-4-piperidone. The product is treated with excess acetic anhydride and then added to crushed ice and excess glacial acetic acid. The solid which separates is isolated as in Example 1 and then treated with butanolic hydrochloric acid to give the hydrochloride salt of N-[2'-(p-methylphenethyl)]-4-butoxy-3-methyl-4-(2'-thienyl)-piperidine. The free base is obtained by neutralizing an aqueous solution of the salt, extracting with ether and evaporating the extract.

EXAMPLE 10

N-[2'-(m-Aminophenethyl)]-4-Ethoxy-4-(2'-Furyl)-Piperidine

A mixture of 4-ethoxy-4-(2'-furyl)-piperidine (5.0 g. made as in Example 4) and 1-(2-chloroethyl)-4-nitrobenzene (5.0 g.) in dry toluene is refluxed for 16 hours with a trace of potassium iodide. After standing overnight, the hydrochloride salt of the product is filtered off. The free base is liberated with aqueous ammonia and extracted with ether. Evaporation of the ether leaves N-[2'-(p-nitrophenethyl)] - 4 - ethoxy - 4 - (2' - furyl)-piperidine.

Hydrogenation of this nitro compound in an alcohol solution such as ethanol using a palladium-on-charcoal catalyst gives N-[2'-(p-aminophenethyl)]-4-ethoxy-4-(2'-furyl)-piperidine.

An ethyl acetate solution of the free base is treated with excess citric acid to give, upon concentration and cooling, the citrate salt.

EXAMPLE 11

N-[2'-(p-Chlorophenethyl)]-4-Ethoxy-4-(2'-Furyl)-Piperidine

A mixture of 4-ethoxy-4-(2'-furyl)-piperidine (2.5 g. prepared as in Example 4) and 1-(2-chloroethyl)-4-chlorobenzene (3.0 g.) is refluxed with a trace of potassium iodide for 12 hours. After standing overnight, crystals of the hydrochloride salt of the product are collected. Treating the salt with aqueous ammonia, extracting with ether and evaporating the extract gives N-[2'-(p-chlorophenethyl)]-4-ethoxy-4-(2'-furyl)-piperidine.

EXAMPLE 12

3-Ethyl-4-Methoxy-N-(4'-Phenylbutyl)-4-(2'-Thienyl)-Piperidine

Reacting 3-ethyl-N-(4'-phenylbutyl)-4-piperidone with lithium thienyl, treating the product with excess acetic anhydride, adding the mixture to crushed ice and excess glacial acetic acid, filtering, neutralizing, and treating with excess methanolic hydrochloric acid as in Example 2 gives the hydrochloride salt of the desired product after recrystallization from ether-ethanol. Neutralizing the salt with aqueous ammonia, extracting with ether and evaporating the extract gives 3-ethyl-4-methoxy-N-(4'-phenylbutyl)-4-(2'-thienyl)-piperidine.

Similarly by reacting 3-butyl-N-(2'-phenethyl)-4-piperidone with lithium thienyl by the procedure described above, 3-butyl-4-methoxy-N-(2'-phenethyl)-4-(2'-thienyl)-piperidine is obtained.

EXAMPLE 13

2-{4'-Methoxy-3'-Methyl-4'-[2''-(4''-Ethylthienyl)]-Piperidyl}-p-Ethylpropiophenone A solution of N-benzyl-4-methoxy-3-methyl-4-[2'-(4'-ethylthienyl)]-piperidine hydrochloride (5.0 g.), made as in Example 1 from N-benzyl-3-methyl-4-piperidone, in ethanol is shaken with hydrogen in the presence of 10% palladium-on-charcoal (2.0 g.) at atmospheric pressure and room temperature. After absorption of gas ceases the product is worked up as in Example 4 to give 4-methoxy-3-methyl-4-[2'-(4' - ethylthienyl)] - piperidine hydrochloride.

Treatment of the above prepared piperidine with p-ethyl-2-dimethylaminopropionphenone methiodide (prepared by Mannich reaction of 3-ethylacetophenone, formaldehyde and dimethylamine), and sodium carbonate in dimethylformamide gives, after working up as in Example 4, the hydrochloride salt of 2-{4'-methoxy-3'-methyl-4'-[2''-(4''-ethylthienyl)] - piperidyl} - p - ethylpropiophenone.

What is claimed is:

1. A chemical compound of the class consisting of a free base and its nontoxic, pharmaceutically acceptable, acid addition salts the free base having the structural formula:

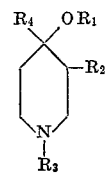

in which $R_1$ is lower alkyl; $R_2$ is a member selected from the group consisting of hydrogen and lower alkyl; $R_3$ is a member of the group consisting of —$(CH_2)_m$—$R_5$ and —$(CH_2)_n$—CO—$R_5$; $R_4$ is a member of the group consisting of 2-furyl, lower alkyl-2-furyl, 2-thienyl and lower alkyl-2-thienyl. $R_5$ is a member selected from the group consisting of phenyl, halophenyl, lower alkylphenyl and aminophenyl; $m$ is an integer having a value of 1–4; and $n$ is an integer having a value of 2–3.

2. A chemical compound having the following formula:

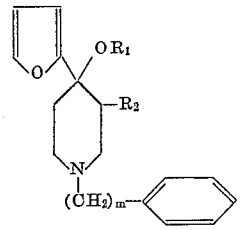

in which $R_1$ and $R_2$ are lower alkyl and $m$ is in integer having a value of 1–4.

3. A chemical compound having the following formula:

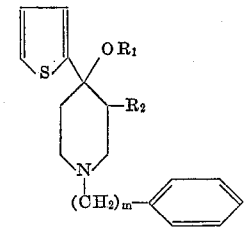

in which $R_1$ and $R_2$ are lower alkyl and $m$ is an integer having a value of 1–4.

4. A chemical compound having the following formula:

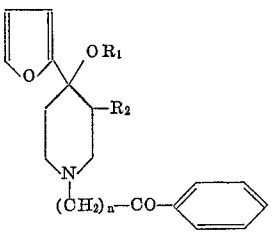

in which $R_1$ and $R_2$ are lower alkyl and $n$ is an integer having a value of 2–3.

5. A chemical compound having the following formula:
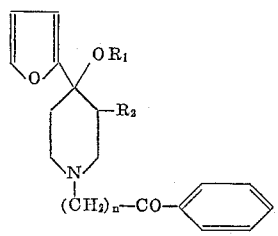
in which $R_1$ and $R_2$ are lower alkyl and $n$ is an integer having a value of 2–3.
6. N - (2'-phenethyl)-4-ethoxy-3-methyl-4-(2'-thienyl)-piperidine.
7. N - (2'-phenethyl)-4-(2'-furyl)-4-methoxy-3-methyl-piperidine hydrochloride.
8. N - (2' - phenethyl)-4-ethoxy-4-(2'-furyl)-3-methyl-piperidine.
No references cited.